US00RE36275E

United States Patent [19]

Kusch et al.

[11] E Patent Number: Re. 36,275

[45] Reissued Date of Patent: Aug. 24, 1999

[54] PLATE CYLINDER FOR A PRINTING PRESS HAVING PLATE MATERIAL IN A CARTRIDGE WITHIN THE PLATE CYLINDER

[75] Inventors: Hans-Jürgen Kusch, Neckargemünd; Walter d'Heureuse, Ladenburg; Uwe Kleinschmidt, Östringen, all of Germany

[73] Assignee: Heidelberger Druckmaschinen AG, Heidelberg, Germany

[21] Appl. No.: 08/815,153

[22] Filed: Mar. 11, 1997

Related U.S. Patent Documents

Reissue of:

[64] Patent No.: 5,435,242
Issued: Jul. 25, 1995
Appl. No.: 08/095,969
Filed: Jul. 22, 1993

[30] Foreign Application Priority Data

Jul. 23, 1992 [DE] Germany ..... 42 24 332

[51] Int. Cl.[6] ..... B41F 27/00

[52] U.S. Cl. ..... 101/142; 101/415.1; 101/477; 242/67.3 R

[58] Field of Search ..... 101/132, 141, 101/142, 395, 401.1, 415.1, 463.1, 465–467, 477; 399/161; 242/67.3 R

[56] References Cited

U.S. PATENT DOCUMENTS

| | | | |
|---|---|---|---|
| 3,491,684 | 1/1970 | Borinsky | 101/451 |
| 3,750,573 | 8/1973 | Haeusler et al. | 101/142 |
| 3,821,931 | 7/1974 | Yamaji et al. | 101/132 |
| 3,826,570 | 7/1974 | Kolibas | 399/161 |
| 3,984,241 | 10/1976 | Schrempp et al. | 399/288 |
| 4,231,652 | 11/1980 | Moser et al. | 399/161 |
| 4,400,083 | 8/1983 | Beisty et al. | 399/161 |
| 5,077,575 | 12/1991 | Narumiya et al. | 399/377 |
| 5,163,368 | 11/1992 | Pensavecchia et al. | 101/467 |
| 5,170,706 | 12/1992 | Rodi et al. | 101/148 |

FOREIGN PATENT DOCUMENTS

| | | |
|---|---|---|
| 4110309 | 10/1991 | Germany . |
| 63-295257 | 12/1988 | Japan . |
| 63-295258 | 12/1988 | Japan . |

*Primary Examiner*—Stephen R. Funk
*Attorney, Agent, or Firm*—Nils H. Ljungman and Associates

[57] ABSTRACT

A plate cylinder for rotary printing presses, in which the printing plate inside the machine is manufactured digitally, e.g. by spark erosion, and in which the covering with printing foil and the changing of individual segments of the foil following printing is done simply, automatically and with maximum precision inside the machine, with the use of a replaceable cartridge for the printing foil.

20 Claims, 10 Drawing Sheets

PLATE CYLINDER FOR A PRINTING PRESS HAVING PLATE MATERIAL IN A CARTRIDGE WITHIN THE PLATE CYLINDER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a plate cylinder for rotary printing machines, in which the printing plate is manufactured, or configured with an image, digitally inside the machine, e.g. by spark erosion.

2. Background Information

On an offset printing machine such as that described immediately above, the images and the text to be transferred are typically digitized, and individual electrodes are then activated by means of a computer. The individual electrodes typically transfer the image elements to a thin foil which is used as the printing plate, so that each individual image element can then be inked and the ink can be transferred in a known manner, via the blanket cylinder, to the material to be printed. This relatively new printing process essentially makes it possible to print the most up-to-date information in an extremely short time, without experiencing the register deviations common with multicolor printing.

One requirement for the correct manufacture of the printing plate in question, i.e. for the precise application of the individual image elements to the printing foil, tends to be that the printing foil must generally be mounted on the plate cylinder with great precision (smooth and taut contact). The precise application of the individual image elements to the printing foil must also generally be accomplished in the shortest possible time, so as not to restrict the efficiency of such a printing press.

OBJECT OF THE INVENTION

Since a printing foil produced in this manner is generally intended to be used in machines in which short set-up times are necessary, and therefore the foil must be changed frequently, the object of the present invention is to permit the initial covering of a plate cylinder with a printing foil, and the changing of individual foil segments following printing, simply, automatically and with great precision, and in the shortest possible time.

SUMMARY OF THE INVENTION

The above object is achieved by the present invention on a plate cylinder for rotary printing machines with a printing foil mounted on the cylinder jacket, where the printing foil is provided with an image generated, for example, by optical and electrical means, and can be replaced by a new printing foil, with a supply roll on which the new printing foil is wound, with a takeup roll on which the used foil provided with images is wound up, with two deflector rollers in the vicinity of the cylinder jacket surface, with two transport rollers, which correspond to the deflector rollers, and with a cartridge, in which the supply roll, the takeup roll, the deflector rollers and the transport rollers are mounted. The cartridge is preferably removably fastened in a passage which extends in the axial direction of the plate cylinder. As a result of the installation of these means in a plate cylinder, following the printing process, it is easy to replace the used segment of foil with a new segment, and when the foil on the supply roll is used up, the cartridge can be replaced completely with a new cartridge, so that once again a large number of foil segments are available for the continued operation of the machine. This entire process takes place in an extremely short time, and can be performed automatically, at least to some extent.

In one advantageous configuration of the invention, the plate cylinder can preferably be equipped with a roller which can be made to approach the cylinder jacket and which is preferably driven by a means of an intermediate wheel, wherein the roller preferably guides the beginning of the foil around the plate cylinder. The plate cylinder is also preferably equipped with guide tongues which guide the leading edge of the foil between the second deflector and transport rollers, whereby adjustment means are preferably provided to pivot the roller and the guide tongues.

By means of the configuration just described, it is possible, following the replacement of a cartridge, to automatically guide and tighten the first foil segment around the cylinder jacket. With this configuration, there can be an automatic threading and an automatic tightening of the foil following the threading, so that the printing press operator is relieved of the need to perform this activity manually.

In an additional configuration of the invention, there is a plate cylinder with a drive wheel which is preferably mounted on one end of the cylinder so that the drive wheel can rotate on a spindle and can preferably be looked in position, with intermediate wheels which are engaged with the drive wheel and which drive spur wheels fastened to the deflector and transport rollers, and with an intermediate wheel which is engaged with the drive wheel and by means of additional intermediate wheels and a spur wheel drives the takeup roll, whereby the spur wheels of the second deflector and transport rollers have freewheels, or spur gears, and the intermediate wheel for the drive of the takeup roll also has a freewheel, or spur gear. It is thereby possible to change the foil segment by means of the machine drive, and to simultaneously precisely tighten the new foil segment on the cylinder jacket of the plate cylinder.

An additional configuration of the invention is characterized by a plate cylinder with a catch lever mounted on the side frame of the machine. When the foil is being pulled in, threaded and pulled taut, the catch lever can preferably be latched in, or about, a bolt or pin on the drive wheel, and with a locking lever which is mounted on the plate cylinder, preferably locks the bolt on the drive wheel after the film has been pulled in, threaded and drawn tight. Once the catch lever has been latched and the machine drive activated, the result is that the foil is transported, or if the machine is rotating in another direction, the foil is tightened. The locking lever essentially prevents the tightened printing foil from coming loose during the running of the machine.

In summary, one feature of the invention resides broadly in a printing press comprising: a frame; a plate cylinder being rotatably mounted on said frame, said plate cylinder having an external surface; an ink reservoir for holding a supply of ink; an inking mechanism for transferring the ink between said ink reservoir and said plate cylinder during operation of said printing press; said inking mechanism comprising a plurality of inking rollers, at least one ink fountain roller, and at least one ink zone transfer roller for transferring ink between said ink fountain roller and at least one of said plurality of inking rollers; a blanket cylinder being rotatably mounted on said frame and for being engaged with said plate cylinder; a plurality of ink applicator rollers for being engaged with said plate cylinder and for providing ink to said plate cylinder; means for producing an inked image and for transferring the inked image from said plate cylinder to said blanket cylinder; said image producing means comprising a continuous web; said continuous web comprising a plurality of portions for being disposed on the external surface of said plate cylinder; said plurality of portions comprising a series of images corresponding to different printing runs; said image producing means being configured for producing a printed product by means of an application of ink to said portions of said image producing means; means for storing said continuous web in a wound state, said storing means being disposed substantially within said plate cylinder; and means for being automatically powered, disposed substantially within said plate cylinder, for automatically replacing a first portion of said image producing means, corresponding to a first printing run, with a second portion of said image producing means, corresponding to a subsequent printing run.

Another aspect of the invention resides broadly in a plate cylinder for a printing press, the printing press comprising a frame, said plate cylinder and the blanket cylinder for being rotatably mounted on the frame, said plate cylinder comprising: an external surface; means for producing an inked image and for transferring the inked image from sad plate cylinder to the blanket cylinder; said image producing means comprising a continuous web; said continuous web comprising a plurality of portions for being disposed on the external surface of said plate cylinder; said plurality of portions comprising a series of images corresponding to different printing runs; said image producing means being configured for producing a printed product by means of an application of ink to said portions of said image producing means; means for storing said continuous web in a wound state, said storing means being disposed substantially within said plate cylinder; and means for being automatically powered, disposed substantially within said plate cylinder, for automatically replacing a first portion of said image producing means, corresponding to a first printing run, with a second portion of said image producing means, corresponding to a subsequent printing run.

Yet another aspect of the invention resides broadly in a cartridge for being disposed in a plate cylinder of a printing press, the printing press comprising a frame and a blanket cylinder, the blanket cylinder and said plate cylinder for being rotatably mounted on the frame; the plate cylinder comprising an external surface; said cartridge comprising: means for producing an inked image and for transferring the inked image from the plate cylinder to the blanket cylinder; said image producing means comprising a continuous web; said continuous web comprising a plurality of portions for being disposed on the external surface of said plate cylinder; said plurality of portions comprising a series of images corresponding to different printing runs; said image producing means being configured for producing a printed product by means of an application of ink to said portions of said image producing means; means for storing said continuous web in a wound state, said storing means being disposed substantially within said cartridge; and means for being automatically powered, disposed substantially within said cartridge, for automatically replacing a first portion of said image producing means, corresponding to a first printing run, with a second portion of said image producing means, corresponding to a subsequent printing run.

A further aspect of the invention resides broadly in a method of operating a printing press, wherein the printing press comprises: a frame, a plate cylinder for being rotatably mounted on the frame; and a blanket cylinder being rotatably mounted on the frame and for being engaged with the plate cylinder; the plate cylinder comprising an external surface; said method comprising the steps of: providing means for producing an inked image and for transferring the inked image from the plate cylinder to the blanket cylinder; configuring the image producing means to comprise a continuous web; configuring the continuous web to comprise a plurality of portions for being disposed on the external surface of the plate cylinder; configuring the plurality of portions to comprise a series of images corresponding to different printing runs; configuring the image producing means for producing a printed product by means of an application of ink to the portions of the image producing means; providing means for storing the continuous web in a wound state, the storing means being disposed substantially within the plate cylinder; and providing means for being automatically powered, disposed substantially within the plate cylinder, for automatically replacing a first portion of the image producing means, corresponding to a first printing run, with a second portion of the image producing means, corresponding to a subsequent printing run; said method further comprising the additional steps of: during a first printing run: disposing the first portion of the image producing means on the external surface of the plate cylinder; producing an inked image by applying ink to the first portion of the image producing means; and transferring the inked image from the plate cylinder to the blanket cylinder; during a second printing run: disposing the second portion of the image producing means on the external surface of the plate cylinder; producing an inked image by applying ink to the second portion of the image producing means; and transferring the inked image from the plate cylinder to the blanket cylinder; and subsequent to the first printing run and prior to the second printing run, by means of the means for being automatically powered, automatically replacing the first portion of the image producing means with the second portion of the image producing means.

BRIEF DESCRIPTION OF THE DRAWINGS

An embodiment of the invention is schematically illustrated in the accompanying drawings, wherein:

[FIG. 1aa is a schematic representation of one printing stand of a printing press in which the present invention may be employed;]

DESCRIPTION OF THE PREFERRED EMBODIMENTS

[Referring first to FIG. 1aa, a rotary print stand 10' of a rotary printing press generally includes: a plate cylinder 1 for having mounted thereon a printing plate or image-carrying foil; an inking unit 12' which includes ink applicator rollers 13' for applying to the printing plate or foil an ink profile; a dampening (or wetting) unit 18' having dampening applicator rollers 19' for transferring a dampening agent to the printing plate or image-carrying foil, a blanket cylinder 16' carrying a rubber blanket 17' for receiving an ink impression from the printing plate or image-carrying foil, and a sheet drum 15' for carrying a printed sheet 14' onto which the ink impression carried by blanket 17' is transferred. A duct roller 23' is typically mounted adjacent to ink duct 21'. Typically, ink is transferred from duct roller 23' to inking unit 12' by means of a vibrator roller 24' which oscillates to successively pick up ink from duct roller 23' and deposit the same on a roller 32' of inking unit 12'. Typically, the printing stand 10' will also include auxiliary mechanisms such as, for example, a duct roller drive 28', a vibrator roller drive 29', an applicator roller throw-off 27" for lifting the ink applicator rollers 13' off of the printing plate or image-carrying foil, a press drive 25' and a sheet feed 27' for supplying the sheets to be printed 26' to sheet drive drum 15'.]

Figure 1:
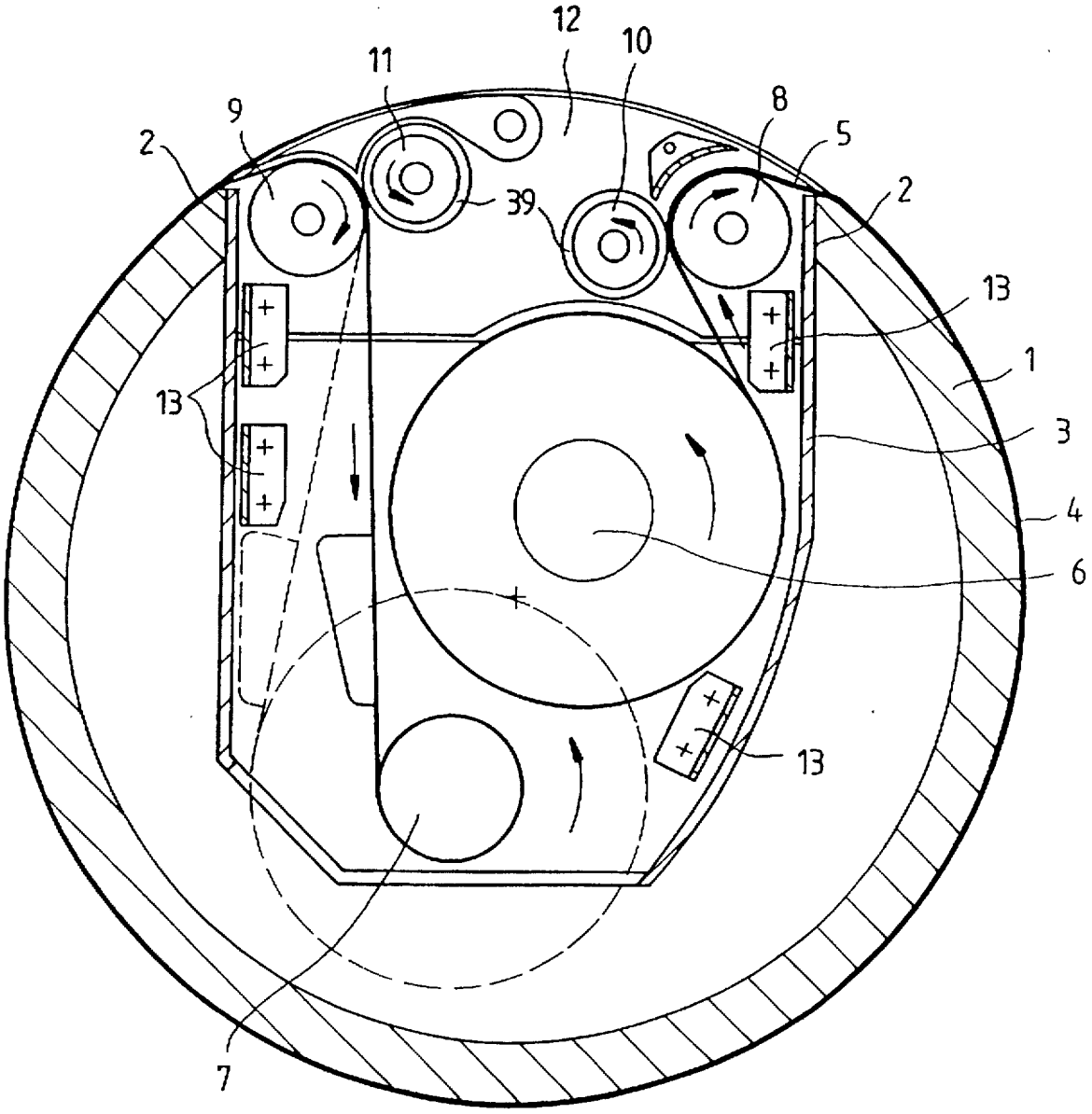
FIG. 1 shows a cross section through the plate cylinder.

FIG. 1 shows the plate cylinder 1 for a rotary printing press with a passage 2 which runs in the axial direction of the plate cylinder. A cartridge 3 is preferably removably fastened in the passage. Drawn tight on the cylinder jacket 4 of the plate cylinder 1 is a printing foil 5, which carries an image which is used in a known manner in an offset printing press to print cut sheets or strips.

In the illustrated embodiment, new printing foil is preferably wound on a feed roll 6. There is also preferably a takeup roll 7, on which the used foil with images can be wound. When the plate cylinder rotates counterclockwise with respect to the arrangement shown in FIG. 1, the printing foil thereby unwound is guided by means of a first deflector roller 8, and the foil to be wound up on the takeup roll 7 is guided by means of a second deflector roller 9, whereby both deflector rollers are preferably located in the vicinity of the cylinder jacket surface 4. The two deflector rollers 8, 9 correspond to transport rollers 10, 11 to transport the foil. The feed roll 6, the takeup roll 7, the deflector rollers 8, 9 and the transport rollers 10, 11 are preferably mounted on both ends in the cartridge 3, whereby to facilitate the replacement of the feed roll 6 or the takeup roll 7, the deflector rollers 8, 9 and transport rollers 10, 11 are mounted in sidepieces 12 which can be lifted up. The sidepieces of the cartridge 3 are stabilized by means of crossbars 13, so that it is easy to remove and transport the cartridge 3.

Figure 2:
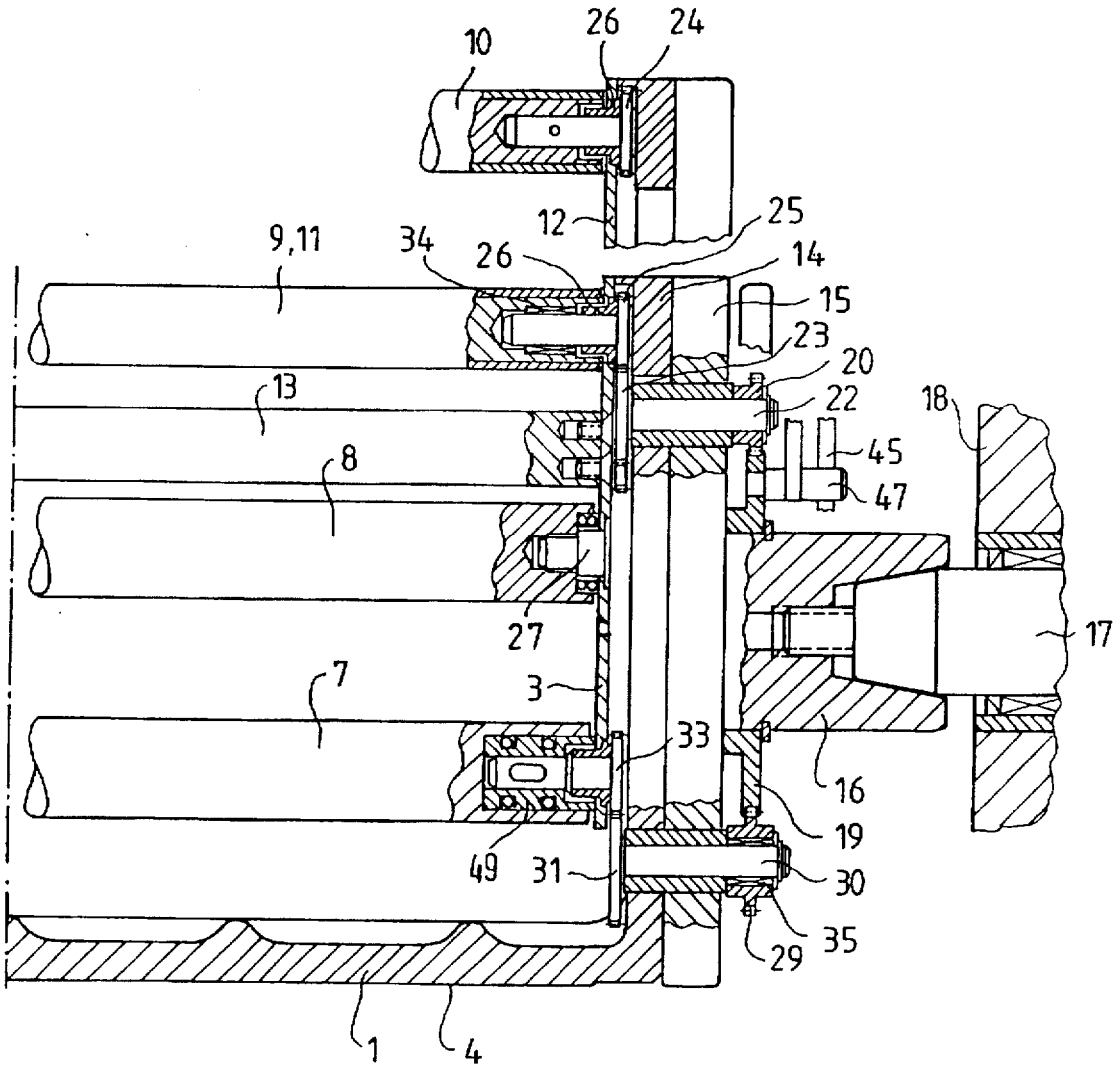
FIG. 2 shows a partial longitudinal section through the plate cylinder.

FIG. 2 shows an end 14 of the plate cylinder 1, on which a cylinder bearer ring 15 is preferably fastened in a known manner. The spindle 16 of the plate cylinder 1 is preferably mounted by means of a bearing neck 17 in the machine side frame 18.

Preferably mounted so that it can rotate on the spindle 16 is a drive wheel 19, which is preferably configured to drive the transport rollers 10, 11 by means of intermediate wheels 20, 21. The intermediate wheels 20, 21 are preferably mounted on bearing necks 22, which are mounted in turn on the end 14 of the plate cylinder 1. Inside the end 14, there are preferably additional spur wheels 23 fastened to the bearing necks 22, which in turn preferably drive spur wheels 24, 25 fastened to the transport rollers 10, 11. The transport rollers 10, 11 are preferably mounted by means of bearing fixtures 27 in the sidepiece 12. Between the spur wheel 24 of the transport roller 10 and the spur wheel 23, there is preferably an additional intermediate wheel 28.

Preferably engaged with the drive wheel 19 is an additional intermediate wheel 29, which is also preferably mounted on a bearing neck 30. Fastened to the bearing neck 30, inside the end of the plate cylinder, is an intermediate wheel 31 which, by means of an additional intermediate wheel 32, preferably drives the spur wheel 33 of the takeup roll 7.

The spur wheels 25, by means of which the second deflector roller 9 and the transport roller 11 are driven, preferably have freewheels 34, so that the rollers can preferably only be driven in one direction of rotation. There is also preferably a freewheel 35 corresponding to the intermediate wheel 29 for the drive of the takeup roll 7. Freewheels, which may be utilized in accordance with the present invention, are well known to those of skill in the art and will not be described further here.

Figure 3:
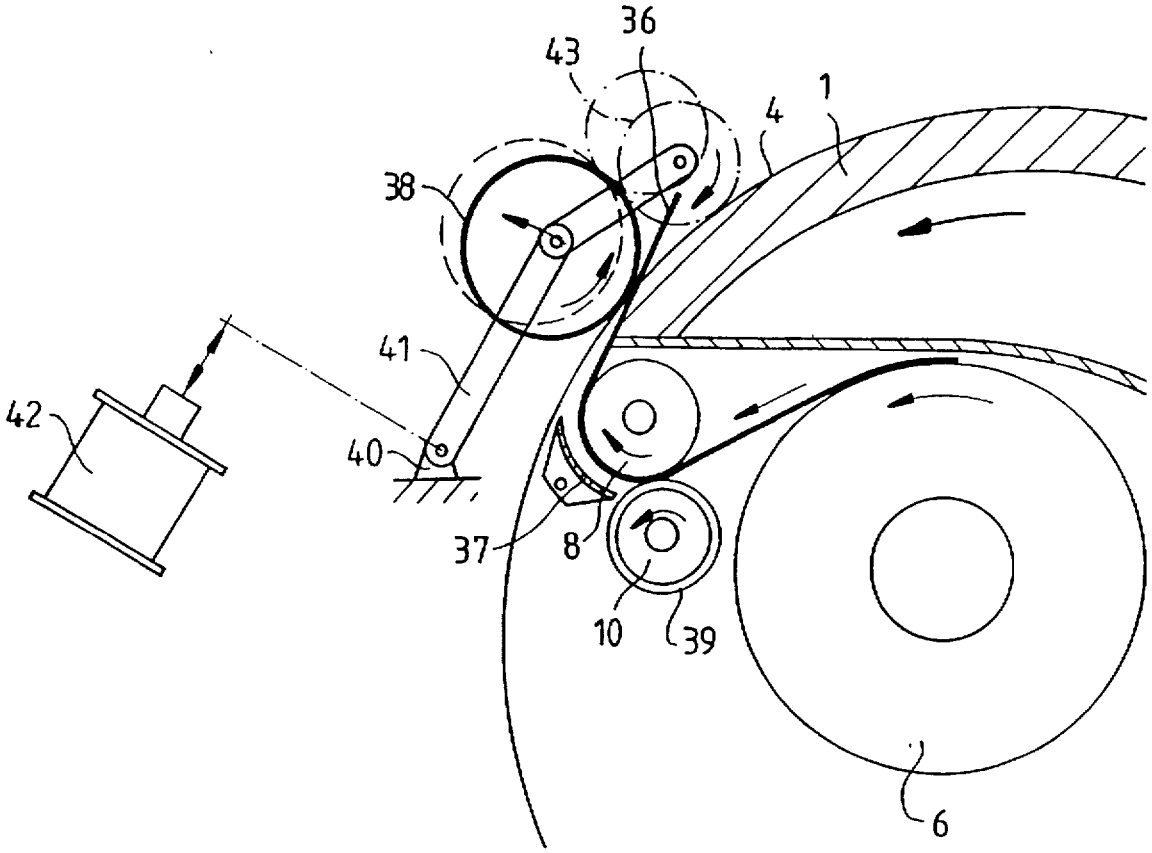
FIG. 3 shows the threading of the leading edge of the foil around the plate cylinder.

As shown in FIG. 3, if a new feed roll 6 is inserted, the leading edge 36 of the foil can preferably be grasped by the deflector roller 8 and the transport roller 10, and deflected by a deflector 37 so that leading edge 36 is introduced between the cylinder jacket surface 4 and a roller 38. To improve transport, the transport rollers 10, 11 can preferably be provided with an elastic coating 39.

The roller 38 is preferably mounted on a bearing 40 so that it can pivot on levers 41, and can be pivoted, e.g. by means of an actuator 42. The roller 38 also preferably supports a spur wheel, which can be driven by means of an intermediate wheel 43, when it is in close approach, by a drive wheel (not shown) of the plate cylinder 1. In FIG. 3, the roller 38 is shown approaching the cylinder jacket 4, and guides the leading edge 36 of the foil around the plate cylinder 1, when the plate cylinder is driven in the counterclockwise direction, on account of high friction.

Thus, as illustrated by FIG. 3, when it is desired that foil be disposed about the printing cylinder 4 in accordance with the present invention, the leading edge 36 of the foil is first preferably directed between deflector roller 8 and transport roller 10. As discussed hereinabove, transport roller 10 is preferably driven through one or more intervening rotational engagements between various rollers and gears, by the rotational movement of plate cylinder 1. Conceivably, deflector roller 8 could be an idle roller which rotates only in response to rotational movement of transport roller 10.

Once directed between deflector roller 8 and transport roller 10, leading edge 36 of the foil may, prior to being grasped on the outer surface of plate cylinder 1, preferably be deflected by an appropriately shaped deflector 37, in order to direct leading edge 36 onto the outer surface of plate cylinder 1 at an appropriate orientation.

Roller 38 is preferably rotatably mounted on a lever 41, which in turn is preferably pivotably mounted on a bearing 40. Bearing 40 is preferably mounted on the frame of the printing press or at another suitable location. Further, an appropriate connection is preferably provided between actuator 42 and lever 41.

Figure 3A:
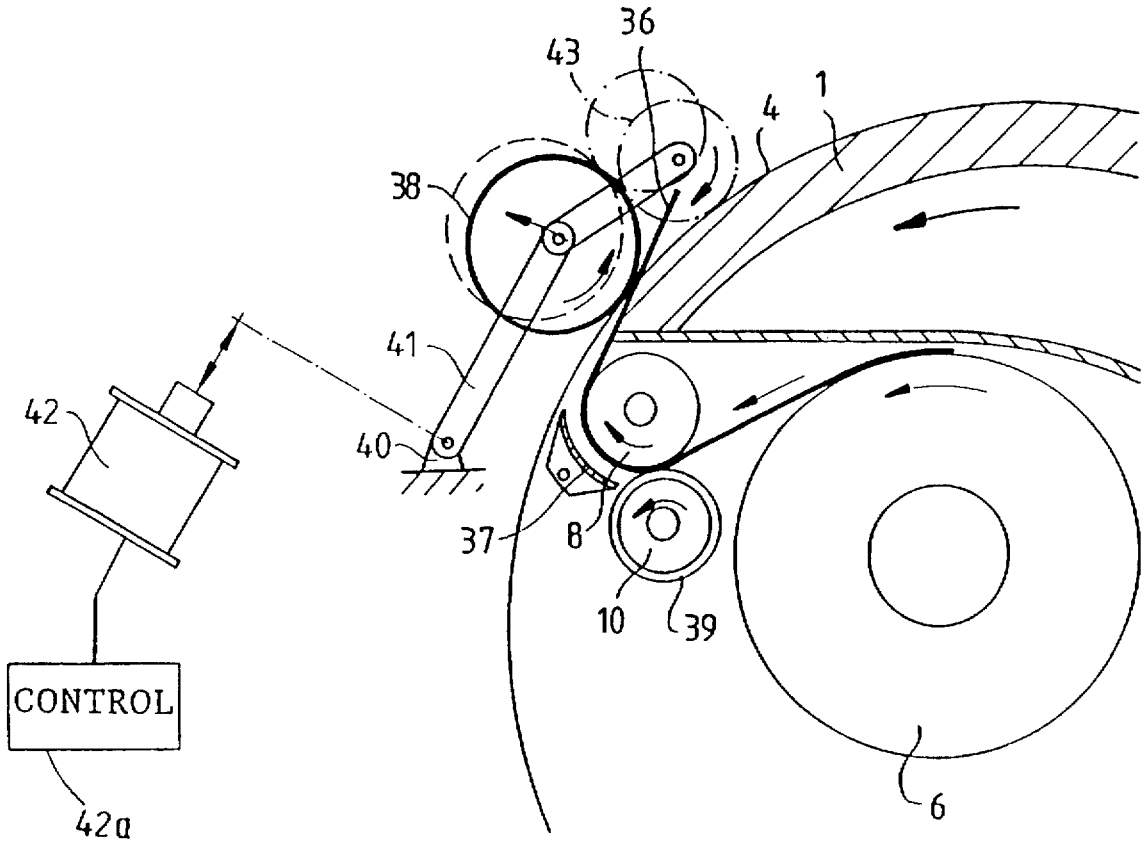
FIG. 3a is essentially the same view as FIG. 3, but illustrates additional components in the printing press.

It will be appreciated that, in order to coordinate the approach of roller 38 with the initial rotation of the plate cylinder, suitable mechanical or electrical means, or both, may preferably be provided. For example, a mechanical arrangement, possibly involving a cam, may be provided to activate actuator 42 to thence effect the approach of roller 38 towards cylinder 1. The actuator 42 could also conceivably be actuable by an electrical arrangement operating similarly, possibly in conjunction with the positioning of the plate cylinder 1, and may possibly be controlled by a control arrangement. Separate switch means may also be provided for actuating actuator 42. A control arrangement for actuator 42 is indicated at 42a in FIG. 3a.

Figure 4:
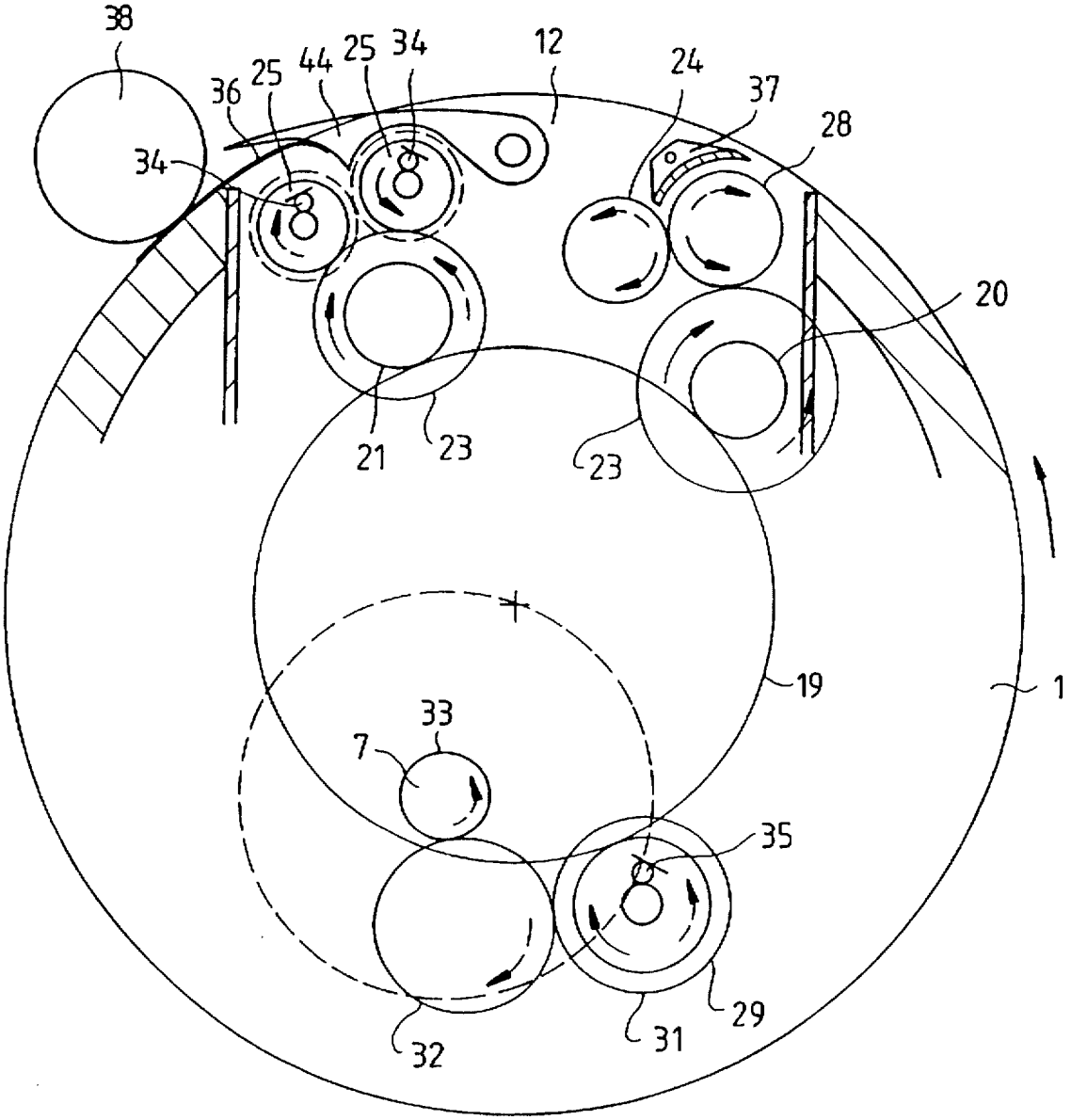
FIG. 4 shows the introduction of the leading edge of the foil between the deflector and transport rollers.

FIG. 4 shows guide tongues 44, which can preferably be configured to pivot on one or more sidepieces 12 of the plate cylinder 1 and can preferably be pivotable outwardly by means of actuators. When the guide tongues 44 pivot out, as shown in FIG. 4, the leading edge 36 of the foil can preferably be guided between the second deflector roller 9 and the transport roller 11, and from there travel to the takeup roll 7. At the takeup roll 7, there are preferably means which grasp and hold the leading edge 36 of the foil.

Thus, in other words, once the leading edge of the foil 36 has been guided around plate cylinder 1 in a manner compatible with that described above with relation to FIG. 3, one or more guide tongues 44 can preferably be pivoted outwardly, by means of a suitable actuator or actuators, and thence direct leading edge 36 of the foil inwardly of the external surface of the plate cylinder 1 and between second deflector roller 9 and transport roller 11. Similarly to transport roller 10, transport roller 11 could be a driven roller and could preferably be driven in a manner similar to transport roller 10. Also, second deflector roller 9 could preferably be an idle roller. At takeup roll 7, there may preferably be suitable means for grasping and holding leading edge 36 of the foil, whereupon a winding, or rolling up, of the foil can preferably be initiated.

Figure 4A:
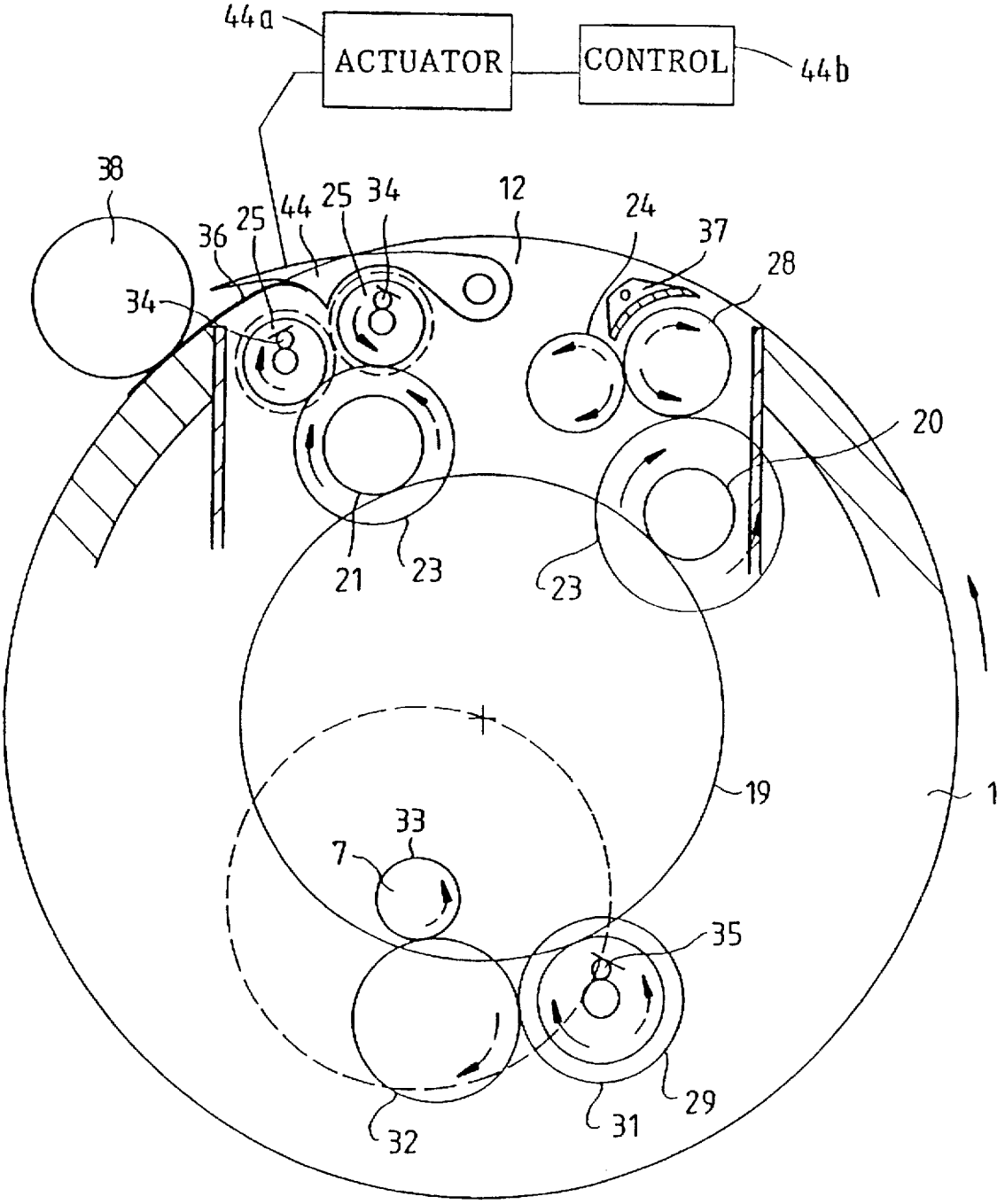
FIG. 4a is essentially the same view as FIG. 4, but illustrates additional components in the printing press.

To ensure coordinated movement of guide tongues 44 with respect to plate cylinder 1, there may preferably be automatic or manually activated means for doing so. For example, an arrangement of gears, wheels, and/or cams may possibly be provided to ensure an automatic mechanical activation of the actuator (not shown) of one or more guide tongues 44. Alternatively, the actuator of one or more guide tongues 44 may possibly be activated by an electronic control arrangement, which arrangement may itself be responsive to the position of plate cylinder 1. In FIG. 4a, an actuator for a guide tongue is indicated at 44a while a control arrangement for actuator 44a is indicated at 44b. An actuator 44a could be embodied by, for example, a hydraulic cylinder or a solenoid, and may preferably be disposed within cartridge 3.

Figure 5:
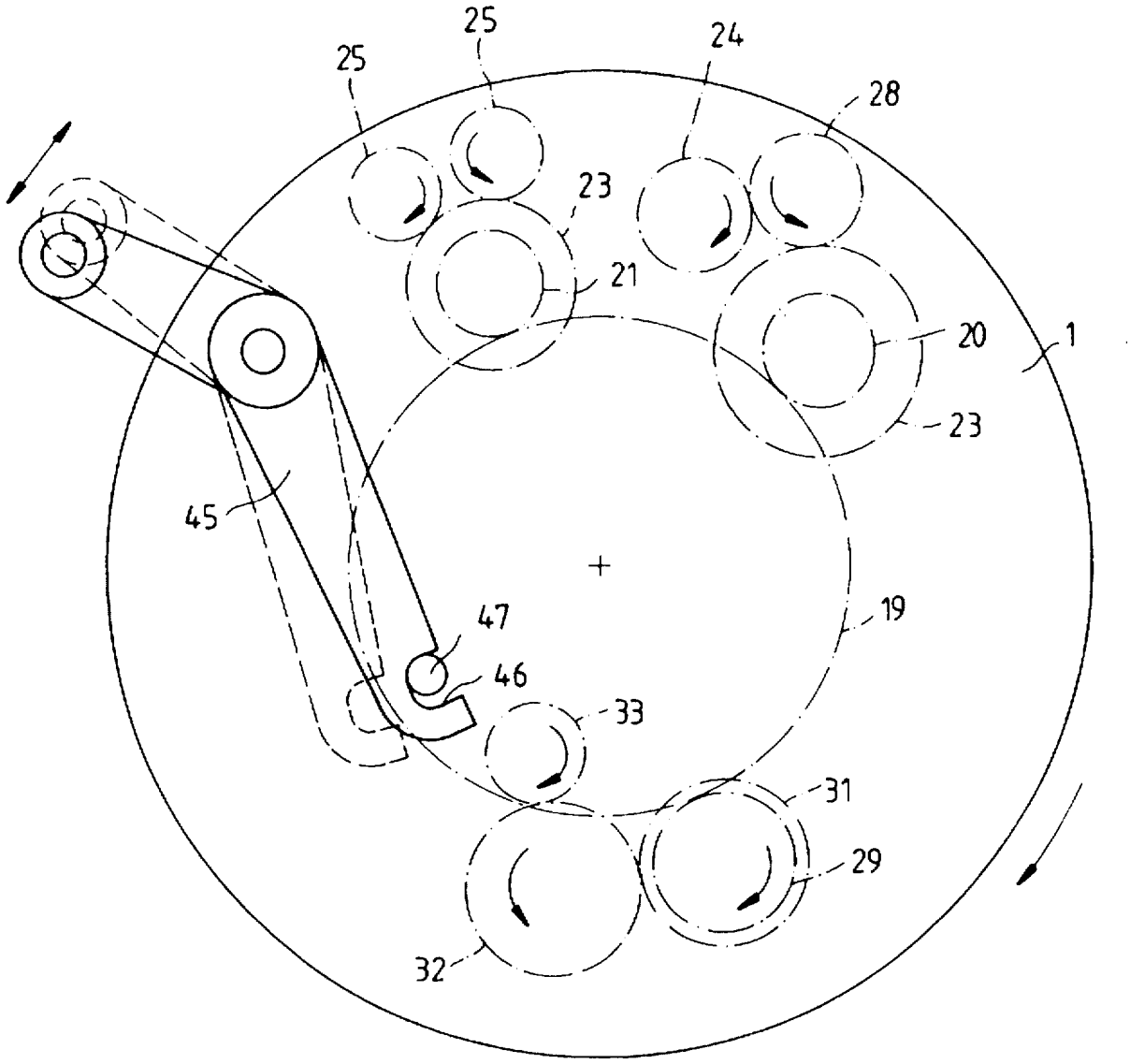
FIG. 5 shows the catch lever during the changing of a foil segment.

FIG. 5 shows a catch lever 45 mounted so that it can pivot on the machine side frame 18 (See FIG. 2). The catch lever 45 can preferably be latched by an actuator (not shown) in the position illustrated by the solid lines, by means of a recess 46 on a bolt 47, which bolt 47 can preferably be fastened to the drive wheel 19.

Figure 6:
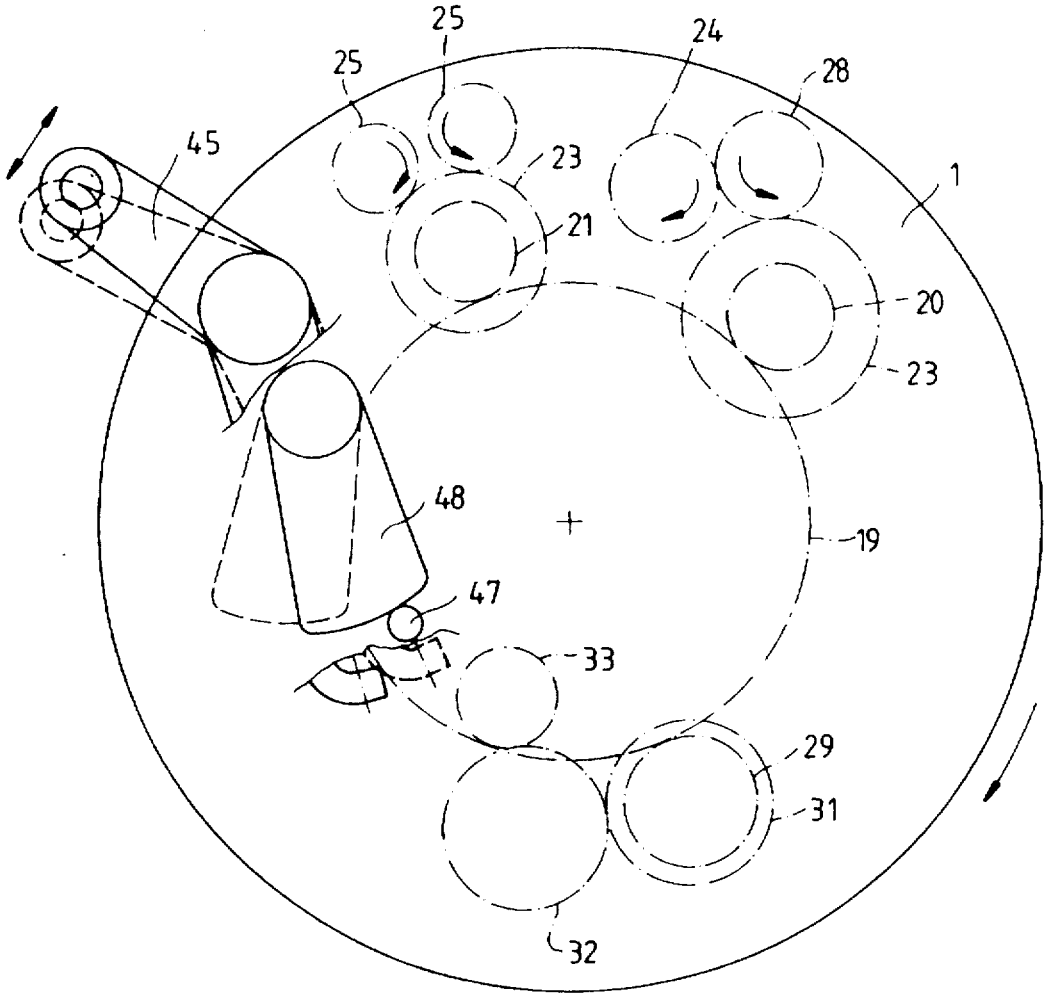
FIG. 6 shows the locking lever while the printing press is running.

Also, as shown in FIG. 6, a locking lever 48 is preferably mounted so that it can pivot on the plate cylinder 1. Preferably, as shown by solid lines, in a pivoted-in position, locking lever 48 preferably locks the bolt 47 on the drive wheel 19. In this figure, the catch lever 45, shown in the solid lines, is disengaged from the bolt 47 and pivoted back.

Figure 5A:
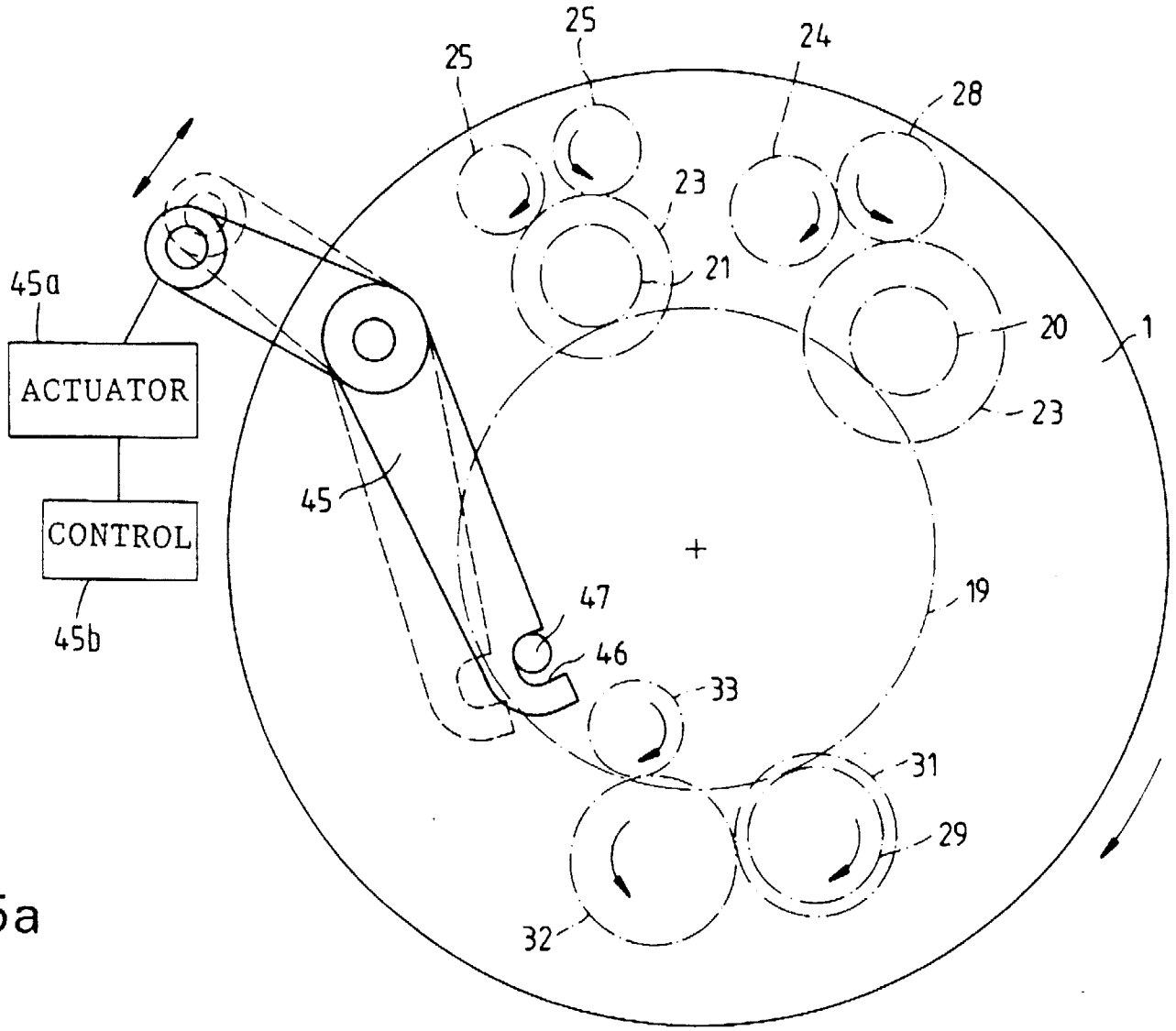
FIG. 5a is essentially the same view as FIG. 5, but illustrates additional components in the printing press.

Thus, as shown in FIG. 5, in order to lock drive wheel 19, catch lever 45 may preferably be provided. Catch lever 45 may preferably be configured to lock drive wheel 19 by engaging an outwardly protruding bolt 47 of the drive wheel in a recess 46 of catch lever 45. As shown in FIG. 5a, a suitable actuator 45a may preferably be provided for pivoting catch lever 45 between a non-engaging position, as shown by the dotted lines, or an engaging position, as shown by the solid lines. A control 45b may preferably be provided to control actuator 45a.

Figure 6A:
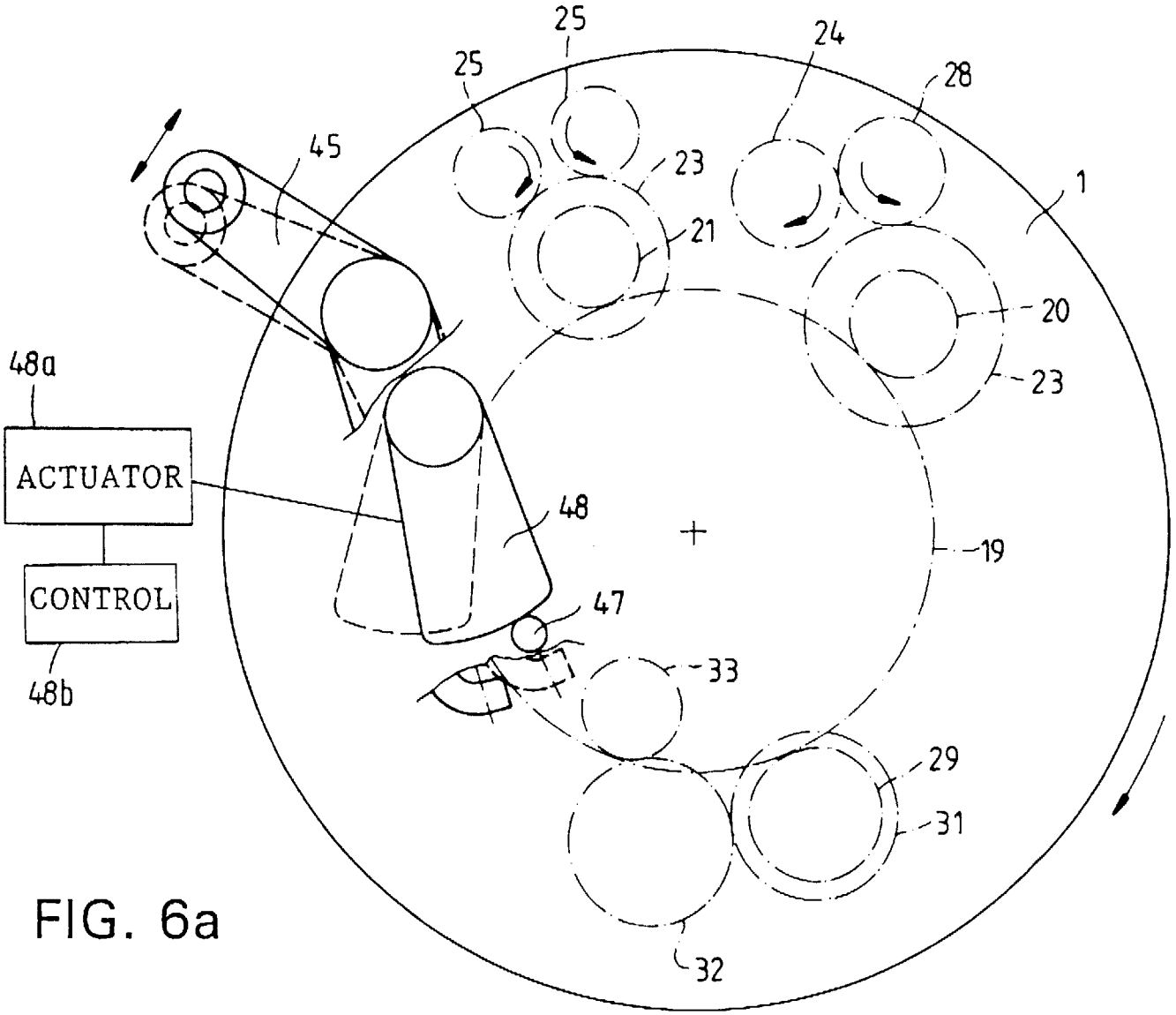
FIG. 6a is essentially the same view as FIG. 6, but illustrates additional components in the printing press.

Additionally, as shown in FIG. 6, a locking lever 48 may preferably provided to lock drive wheel 19. Such a locking lever 48 may conceivably be provided as a supplement to catch lever 45 or as a sole locking arrangement for drive wheel 19. In the former case, locking lever 48 may preferably be pivotable about a pivot point on plate cylinder 1 or, possibly, on catch lever 45 itself. Also, as shown in FIG. 6a, a suitable actuator 48a may preferably be provided for displacing the locking lever 48, and a control arrangement 48b may preferably be provided for controlling actuator 48a.

A sequence of operations for the insertion of a new feed roll will now be discussed.

If a cartridge 3 with a new feed roll 6 is inserted and bolted into, or attached by some other means to, the plate cylinder 1, the cylinder 1 can thence preferably be moved by means of the machine drive in a slow rotational movement (preferably counterclockwise). At the same time, the roller 38 can preferably be made to approach the cylinder 1 and be lowered to the leading edge 36 of the foil.

The roller 38 is thence preferably rotated in the same direction of rotation as the cylinder jacket 4, so that the leading edge 36 of the foil is pulled taut and is pressed against the cylinder jacket. Depending on the type of foil and the coefficients of friction required, the roller 38 can preferably have any of a number of different coatings (e.g. rubber, plastic, felt, etc.). Conceivably, roller 38 may be driven separately from plate cylinder 1 or may be provided with an arrangement which permits it to be driven as a result of the rotation of plate cylinder 1. Such an arrangement may be a control arrangement linking the drive systems of plate cylinder 1 and roller 38, or may be a mechanical arrangement in the form of intervening and rotatingly cooperating gears and/or wheels.

In a preferred embodiment of the present invention, the drive wheel 19 may preferably be blocked, or locked, by the catch lever 45, as shown in FIG. 5. Thus, as a result of the rolling contact of the intermediate wheels 20, 21 with the stations drive wheel 19, the foil can preferably be transported out of the cylinder and opposite to the current direction of rotation of the plate cylinder 1 around the cylinder, without changing the position of the leading edge 36 of the foil in relation to the machine side frame, and thus also in relation to the roller 38.

Therefore, once the rotational movement of drive wheel 19 is essentially locked as shown in FIG. 5, upon rotation of plate cylinder 1, intermediate wheels 20 and 21 will essentially engage in rolling contact with now-stationary drive wheel 19. Thence, essentially as plate cylinder 1 undergoes rotation itself, the leading edge 36 of the foil will essentially remain somewhat stationary with respect to printing press frame 18 and roller 38. During this rotation of the plate cylinder 1, intermediate wheels 20 and 21 and, accordingly, transport rollers 8 and 9, will also rotate and will encourage the relative displacement between leading edge 36 of the foil and plate cylinder 1. Thus, as plate cylinder 1 rotates, the leading edge 36 of the foil essentially progresses circumferentially about the plate cylinder 1 until, as described further above with relation to FIG. 4, leading edge 36 arrives at a point where it will be directed inwardly towards takeup roll 7.

Thus, after approximately one rotation of the cylinder, the end of the cylinder jacket surface 4 essentially moves past the roller 38, and the leading edge 36 of the foil reaches the passage 2, as shown in FIG. 4. At this point, the leading edge 36 of the foil is preferably grasped by the extended guide tongues 44 and is thence preferably guided between the deflector roller 9 and the transport roller 11, and guided thereby to the takeup roll 7. At that point, the foil can essentially be grasped, for example, by needles or pins which are located on the core of the takeup roll, and can be wound up as in the film transport mechanism in a camera.

To keep the foil taut during the winding, the takeup roll 7 is preferably driven by means of a slip, or friction, clutch 49, illustrated in FIG. 2, at a somewhat higher rate of speed than the speed at which the foil is being transported. The lever 45 is then preferably pivoted back into its rest position, and the initial covering of the cylinder jacket with fresh foil is complete.

To replace a used section of foil with a new one, the cylinder is also preferably set in counterclockwise rotational motion by means of the press drive. The drive wheel 19, by means of the catch lever mounted on the machine side frame 18, can preferably be blocked, or locked, in the appropriate position by latching in bolt 47. As a result of the rolling contact of the intermediate wheels 20, 21 against the drive wheel 19, the printing foil 5 is unwound from the feed roll 6 as the cylinder rotates and is wound up on the takeup roll 7. To maintain a certain tension in the foil during this operation, the takeup roll 7 can preferably be driven at a somewhat higher speed by means of slip clutch 49. Since the direction of transport of the printing foil 5 is essentially opposite to the direction of rotation of the cylinder, and the transport speed of the foil is preferably essentially the same as the circumferential speed of the plate cylinder 1, the threading process is completed after one revolution.

To tighten the printing foil 5 on the cylinder jacket surface 4, the plate cylinder 1 is preferably rotated in an opposite direction, while the catch lever 45 remains latched in the bolt 47. Subsequently, deflector rollers 8, 9, together with the transport rollers 10, 11, will essentially pull the loose foil, by means of the freewheels in the gear wheels, into the Cylinder on both ends of the passage, until the foil is taut against the cylinder jacket surface 4. Once the foil has been pulled taut, as shown in FIG. 6, the locking lever 48 fastened to the end of the cylinder can thence preferably fall into the locked position on the bolt 47 of the drive wheel 19, to prevent any unthreading and loosening of the printing foil 5. The catch lever 45 can thence preferably be simultaneously pivoted back into its rest position. Thence, the printing foil will essentially be in its final, tightened position. It is conceivable to make the angle of rotation of the plate cylinder 1 somewhat greater than may otherwise be necessary, in order to guarantee a secure tightening.

As will be best appreciated from FIG. 4, after the plate cylinder 1 has been rotated counterclockwise during the threading, the transport roller 10 can preferably be driven by means of the intermediate wheels 20, 23 and 28, so that it is also rotated counterclockwise. The foil is thereby unwound from the feed roll 6. At the end of the passage, by means of the intermediate wheels 21, 23, the deflector roller 9 with the spur wheel 25 and the freewheel 34 is driven so that it rotates clockwise.

Since the freewheel 34 in the transport roller 11 can, in a preferred embodiment of the present invention, thereby release the drive, this roller can, in such a case, preferably be driven only by friction by means of the deflector roller 9. The printing foil is thereby transported into the cylinder, and is wound up on the takeup roll 7 driven by means of the intermediate wheels 29, 31 and 32.

In a preferred embodiment of the present invention, the sequence of rotating transport roller 10 counterclockwise after plate cylinder 1 has been rotated, may preferably be undertaken by driving drive wheel 19, wherein, preferably, plate cylinder 1 may preferably be stationary. In this regard, drive wheel 19 may preferably be provided with a driving arrangement which is separate from that of plate cylinder 1.

During the tightening of the printing foil 5, the plate cylinder 1 preferably rotates clockwise, the deflector roller 8 rotates counterclockwise, and the transport roller 10 rotates clockwise, to pull the printing foil 5 back into the cylinder. The deflector roller 9 and the transport roller 11 thereby retain the direction of rotation which they assumed during the threading operation. By means of the intermediate wheels 21, 23, the transport roller 11 with its spur wheel 25 is preferably driven by means of its freewheel 34. The freewheel 34 of the deflector roller 9 can preferably thereby release the drive, and the deflector roller 9 can thence preferably be driven by friction, by means of the transport roller 11. The printing foil 5 will thus essentially be pulled taut by both pairs of rollers (8,10 and 9,11) on both sides. So that the takeup roll 7 no longer unwinds the printing foil 5 during the tightening, a freewheel 35 can preferably be inserted between the intermediate wheels 29 and 31. Such a freewheel is indicated at 35 in FIG. 4a.

Thus, in accordance with a preferred embodiment of the present invention, in order to effect the counterclockwise rotation of deflector roller 8 and the simultaneous clockwise rotation of transport roller 10, drive wheel 19 may again preferably be driven independently of plate cylinder 1. In this instance, conceivably, plate cylinder 1 and drive wheel 19 could preferably be driven simultaneously but independently from one another.

One feature of the invention resides broadly in the plate cylinder for rotary printing machines with a printing foil 5 tightened on the cylinder jacket surface 4, whereby the printing foil 5 is provided with an image by electrical or optical means, and can be replaced with a new printing foil, with a supply roll 6 on which the new printing foil 5 is wound, with a takeup roll 7 on which the used foil with images is wound up, with two deflector rollers 8, 9 in the vicinity of the cylinder jacket surface 4, with two transport rollers 10, 11, which correspond to the deflector rollers 8, 9, and with a cartridge 3, in which are mounted the supply roll 6, the takeup roll 7, the deflector rollers 8, 9 and the transport rollers 10, 11, whereby the cartridge 3 is removably fastened in a passage 2 which extends in the axial direction of the plate cylinder 1.

Another feature of the invention resides broadly in the plate cylinder, with a roller 38 which can be made to approach the cylinder jacket 4 and is driven by means of an intermediate wheel 43, which roller 38 guides the leading edge 36 of the foil around the plate cylinder 1, and with guide tongues 44 which guide the leading edge 36 of the foil between the second deflector 9 and transport roller 11, whereby there are actuators 42 to pivot the roller 38 in and to pivot the guide tongues 44 out.

Yet another feature of the invention resides broadly in the plate cylinder, with a drive wheel 19 which is mounted on one end 14 of the cylinder, and can rotate on a spindle 16 and be locked in position, with intermediate wheels 20, 21 which are engaged with the drive wheel 19 and which drive spur wheels 24, 25 fastened to the deflector rollers 9 and the transport rollers 10, 11, and with an intermediate wheel 29 which is engaged with the drive wheel 19 and by means of additional intermediate wheels 31, 32 and a spur wheel 33 drives the takeup roll 7, whereby the spur wheels 25 of the second deflector roller 9 and transport roller 11 have freewheels 34, and the intermediate wheel 29 also has a freewheel 35 to drive the takeup roll 7.

Still yet another feature of the invention resides broadly in the plate cylinder, with a catch lever 45 mounted on the machine side frame 18 and which, when the printing foil 5 is introduced, threaded and pulled taut, is latched in a bolt 47 on the drive wheel 19, and with a locking lever 48 which is mounted on the plate cylinder 1 and following the introduction, threading and tightening of the printing foil, locks the bolt 47 on the drive wheel 19.

Examples of printing presses and components associated therewith, which may be utilized in accordance with the embodiments of the present invention, may be found in the following U.S. Patents: Rodi et al. U.S. Pat. No. 5,170,706, which issued on Dec. 15, 1992; Rodi U.S. Pat. No. 5,081,926, which issued on Jan. 21, 1992.; and Löffler U.S. Pat. No. 5,010,820, which issued on Apr. 30, 1991.

Examples of slip clutches, which may be utilized in accordance with the embodiments of the present invention, may be found in the following U.S. Patents: Gunter et al. U.S. Pat. Re. No. 34,146, which issued on Dec. 22, 1992; Friedmann U.S. Pat. No. 5,139,124, which issued on Aug. 18, 1992; and Flaig U.S. Pat. No. 5,127,631, which issued on Jul. 7, 1992.

All of the patents, patent applications and publications recited herein, if any, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

[1. A sheet-fed rotary printing press comprising:

a frame;

a plate cylinder being rotatably mounted on said frame, said plate cylinder having an external surface;

an ink reservoir for holding a supply of ink;

an inking mechanism for transferring the ink between said ink reservoir and said plate cylinder during operation of said printing press;

said inking mechanism comprising a plurality of inking rollers, at least one ink fountain roller, and at least one ink transfer roller for transferring ink between said ink fountain roller and at least one of said plurality of inking rollers;

a blanket cylinder being rotatably mounted on said frame and for being engaged with said plate cylinder;

a plurality of ink applicator rollers for being engaged with said plate cylinder and for providing ink to said plate cylinder;

means for producing an inked image and for transferring the inked image from said plate cylinder to said blanket cylinder;

said image producing means comprising a sheet;

said sheet comprising a plurality of portions for being disposed on the external surface of said plate cylinder;

said plurality of portions comprising a series of images corresponding to different printing runs;

said image producing means being configured for producing a printed product by means of an application of ink to said portions of said image producing means;

means for storing said sheet in a wound state, said storing means being disposed substantially within said plate cylinder;

means for being powered, disposed substantially within said plate cylinder, for replacing a first portion of said image producing means, corresponding to a first printing run, with a second portion of said image producing means, corresponding to a subsequent printing run;

said sheet comprising:

said first portion of said image producing means, corresponding to the first printing run; and said second portion of said image producing means, corresponding to the subsequent printing run;

said storing means comprising:

first roll means for storing said sheet in a wound state;

second roll means for receiving said sheet and for winding said foil;

said means for being powered comprising means for:

unwinding said sheet from said first roll means;

disposing said sheet about a substantial portion of said plate cylinder; and winding said unwound sheet on said second roll means;

replacing said first portion of said sheet, corresponding to the first printing run, with said second portion of said sheet, corresponding to the subsequent printing run, by unwinding a portion of said sheet from said first roll means and winding another portion of said sheet onto said second roll means;

said plate cylinder comprising groove means and cartridge means being disposed within said groove means;

means for selectively fastening said cartridge means into said groove means;

said cartridge means being removable from said groove means by means of said fastening means; and said first roll means, said second roll means and said means for being powered being disposed within said cartridge means.]

[2. The printing press according to claim 1, further comprising:

said groove means is oriented in an axial direction of said plate cylinder.]

[3. The printing press according to claim 2, wherein:

said means for being powered comprises means for being automatically powered;

said means for being automatically powered comprises roller means;

said cartridge means comprises:

means for rotatably mounting said first roll means;

means for rotatably mounting said second roll means;

means for rotatably mounting said roller means of said means for being automatically powered;

a first sidepiece;

a second sidepiece;

said first sidepiece and said second sidepiece each comprising a portion of each of said:

means for rotatably mounting said first roll means;

means for rotatably mounting said second roll means; and means for rotatably mounting said roller means of said means for being automatically powered; and support means, being disposed axially with respect to said plate cylinder, for stabilizing said first and second sidepieces with respect to one another.]

[4. The printing press according to claims 3, further comprising:

said sheet comprising a foil;

said roller means of said means for being automatically powered comprising:

first and second deflector roller means;

first and second transport roller means;

said first deflector roller means being rotatingly engageable with said first transport roller means;

said second deflector roller means being rotatingly engageable with said second transport roller means;

said first deflector roller means and said first transport roller means being configured for:

receiving a leading edge of said foil from said first roll means;

transporting said leading edge of said foil towards said external surface of said plate cylinder; and continuing to direct said foil while said foil is being disposed about said plate cylinder and while said first portion of said foil is being replaced by said second portion of said foil; and said second deflector roller means and said second transport roller means being configured for:

receiving said leading edge of said foil from said external surface of said plate cylinder, once said foil has been disposed about said substantial portion of said plate cylinder;

transporting said leading edge of said foil towards said second roll means; and continuing to direct said foil while said foil is being disposed about said plate cylinder and while said first portion of said foil is being replaced by said second portion of said foil.]

[5. The printing press according to claim 4, further comprising:

means for tightening said foil on said external surface of said cylinder;

said first and second transport roller means, and said first and second deflector roller means all being disposed in the vicinity of said external surface of said plate cylinder;

external roller means being selectively positionable between a first position, apart from said plate cylinder, and a second position, in engagement with said plate cylinder;

means for positioning said external roller means;

said means for positioning said external roller means comprising:

lever means being pivotably mounted on said frame, said external roller means being rotatably mounted on said lever means; and means for pivoting said lever means; said external roller means being configured for:

receiving, in cooperation with said plate cylinder, said leading edge of said foil from said first transport roller means and said first deflector roller means;

directing said leading edge of said foil about said substantial portion of said plate cylinder; and directing said leading edge of said foil to said second transport roller means and said second deflector roller means, once said foil has been disposed about said substantial portion of said plate cylinder;

guide tongue means disposed adjacent said second transport roller means and said second deflector roller means;

said guide tongue means being configured for:

receiving said leading edge of said foil from said external roller means when said foil has been disposed about said substantial portion of said plate cylinder;

directing said leading edge of said foil to said second transport roller means and said second deflector roller means;

said guide tongue means being pivotably mounted in said cartridge means;

means for pivoting said guide tongue means between a first position, wherein said guide tongue means is pivoted outwardly of said external surface of said plate cylinder, and a second position, wherein said guide tongue means is pivoted towards said external surface of said plate cylinder and is substantially flush with said external surface of said plate cylinder;

drive wheel means being mounted at an end of said plate cylinder;

spindle means being disposed through said plate cylinder;

said drive wheel means being rotatably mounted on said spindle means;

intermediate wheel means being rotatably engaged with said drive wheel means;

spur wheel means being disposed at an end of each of said second deflector roller means, said first transport roller means and said second transport roller means;

said intermediate wheel means comprising first, second, third and fourth intermediate wheels;

spur wheel means being disposed at an end of said second roll means;

said first intermediate wheel means being rotatably engaged with said spur wheel means of said second deflector roller means;

said second intermediate wheel means being rotatably engaged with said spur wheel means of said first transport roller means;

said third intermediate wheel means being rotatably engaged with said spur wheel means of said second transport roller means;

said fourth intermediate wheel means being rotatably engaged with said spur wheel means of said second roll means;

each of said first, second, third and fourth intermediate wheel means comprising freewheel means for ensuring a singular direction of rotation of each of said first, second, third and fourth intermediate wheel means;

catch lever means being mounted on said frame of said printing press;

said catch lever means comprising a recess;

said drive wheel means comprising a bolt being disposed thereupon;

said recess of said catch lever means being configured for accommodating said bolt to arrest rotational movement of said drive wheel means;

said catch lever means being positionable between a first position, wherein said recess accommodates said bolt and the rotational movement of said drive wheel means is arrested, and a second position wherein said catch lever means is disposed away from said bolt to permit rotational movement of said drive wheel means;

locking lever means being pivotably mounted on said plate cylinder;

said locking lever means being configured for locking said bolt on said drive wheel means;

means for displacing said locking lever means to lock said bolt once said foil has been disposed about said substantial portion of said plate cylinder and has been tightened on said plate cylinder; and slip clutch means mounted coaxially with said second roll means.]

6. A plate cylinder for a sheet-fed rotary printing press, such a printing press comprising a frame and a blanket cylinder, said plate cylinder and the blanket cylinder for being rotatably mounted on the frame, said plate cylinder comprising:

an external surface;

means for producing an inked image and for transferring the inked image from said plate cylinder to the blanket cylinder;

said image producing means comprising a foil;

said foil comprising a plurality of portions for being disposed on the external surface of said plate cylinder;

said plurality of portions comprising a series of images corresponding to different printing runs;

said image producing means being configured for producing a printed product by means of an application of ink to said portions of said image producing means;

means for storing said foil in a wound state, said storing means being disposed substantially within said plate cylinder;

means for being powered, disposed substantially within said plate cylinder, for replacing a first portion of said image producing means, corresponding to a first printing run, with a second portion of said image producing means, corresponding to a subsequent printing run;

said foil comprising:

said first portion of said image producing means, corresponding to the first printing run; and said second portion of said image producing means, corresponding to the subsequent printing run;

said storing means comprising:

first roll means for storing said foil in a wound state;

second roll means for receiving said foil and for winding said foil;

said means for being powered comprising means for:

unwinding said foil from said first roll means;

disposing said foil about a substantial portion of said plate cylinder; and winding said unwound foil on said second roll means;

replacing said first portion of said foil, corresponding to the first printing run, with said second portion of said foil, corresponding to the subsequent printing run, by unwinding a portion of said foil from said first roll means and winding another portion of said foil onto said second roll means;

said plate cylinder comprising groove means and cartridge means being disposed within said groove means;

means for selectively fastening said cartridge means into said groove means;

said cartridge means being removable from said groove means by means of said fastening means;

said first roll means, said second roll means and said means for being powered being disposed within said cartridge means.

7. The plate cylinder according to claim 6, further comprising:

said groove means is oriented in an axial direction of said plate cylinder.

8. The plate cylinder according to claim 7, wherein: said means for being powered comprises roller means; said cartridge means comprises:

means for rotatably mounting said first roll means;

means for rotatably mounting said second roll means;

means for rotatably mounting said roller means of said means for being powered;

a first sidepiece;

a second sidepiece;

said first sidepiece and said second sidepiece each comprising a portion of each of said:

means for rotatably mounting said first roll means;

means for rotatably mounting said second roll means; and means for rotatably mounting said roller means of said means for being powered; and support means, being disposed axially with respect to said plate cylinder, for stabilizing said first and second sidepieces with respect to one another.

9. The plate cylinder according to claim 8, further comprising:

said roller means of said means for being powered comprising:

first and second deflector roller means;

first and second transport roller means;

said first deflector roller means being rotatingly engageable with said first transport roller means;

said second deflector roller means being rotatingly engageable with said second transport roller means;

said first deflector roller means and said first transport roller means being configured for:

receiving a leading edge of said foil from said first roll means;

transporting said leading edge of said foil towards said external surface of said plate cylinder; and continuing to direct said foil while said foil is being disposed about said plate cylinder and while said first portion of said foil is being replaced by said second portion of said foil; and said second deflector roller means and said second transport roller means being configured for:

receiving said leading edge of said foil from said external surface of said plate cylinder, once said foil has been disposed about said substantial portion of said plate cylinder;

transporting said leading edge of said foil towards said second roll means; and continuing to direct said foil while said foil is being disposed about said plate cylinder and while said first portion of said foil is being replaced by said second portion of said foil.

10. The plate cylinder according to claim 9, further comprising:

means for tightening said foil on said external surface of said cylinder;

said first and second transport roller means, and said first and second deflector roller means all being disposed in the vicinity of said external surface of said plate cylinder;

said leading edge of said foil for being:

received from said first transport roller means and said first deflector roller means;

directed about said substantial portion of said plate cylinder; and directed to said second transport roller means and said second deflector roller means, once said foil has been disposed about said substantial portion of said plate cylinder;

guide tongue means disposed adjacent said second transport roller means and said second deflector roller means;

said guide tongue means being configured for:

receiving said leading edge of said foil when said foil has been disposed about said substantial portion of said plate cylinder;

directing said leading edge of said foil to said second transport roller means and said second deflector roller means;

said guide tongue means being pivotably mounted in said cartridge means;

means for pivoting said guide tongue means between a first position, wherein said guide tongue means is pivoted outwardly of said external surface of said plate cylinder, and a second position, wherein said guide tongue means is pivoted towards said external surface of said plate cylinder and is substantially flush with said external surface of said plate cylinder;

drive wheel means being mounted at an end of said plate cylinder;

spindle means being disposed through said plate cylinder;

said drive wheel means being rotatably mounted on said spindle means;

intermediate wheel means being rotatably engaged with said drive wheel means;

spur wheel means being disposed at an end of each of said second deflector roller means, said first transport roller means and said second transport roller means;

said intermediate wheel means comprising first, second, third and fourth intermediate wheels;

spur wheel means being disposed at an end of said second roll means;

said first intermediate wheel means being rotatably engaged with said spur wheel means of said second deflector roller means;

said second intermediate wheel means being rotatably engaged with said spur wheel means of said first transport roller means;

said third intermediate wheel means being rotatably engaged with said spur wheel means of said second transport roller means;

said fourth intermediate wheel means being rotatably engaged with said spur wheel means of said second roll means;

each of said first, second, third and fourth intermediate wheel means comprising freewheel means for ensuring a singular direction of rotation of each of said first, second, third and fourth intermediate wheel means;

said drive wheel means comprising a bolt being disposed thereupon;

said bolt for being accommodated by catch lever means, mounted on the frame of the printing press, to arrest rotational movement of said drive wheel means;

locking lever means being pivotably mounted on said plate cylinder;

said locking lever means being configured for locking said bolt on said drive wheel means;

means for displacing said locking lever means to lock said bolt once said foil has been disposed about said substantial portion of said plate cylinder and has been tightened on said plate cylinder; and slip clutch means mounted coaxially with said second roll means.

11. A cartridge for being disposed in a plate cylinder of a sheet-fed rotary printing press, such a printing press comprising a frame and a blanket cylinder, the blanket cylinder and said plate cylinder for being rotatably mounted on the frame; the plate cylinder comprising an external surface; said cartridge comprising:

means for producing an inked image and for transferring the inked image from the plate cylinder to the blanket cylinder;

said image producing means comprising a foil;

said foil comprising a plurality of portions for being disposed on the external surface of said plate cylinder;

said plurality of portions comprising a series of images corresponding to different printing runs;

said image producing means being configured for producing a printed product by means of an application of ink to said portions of said image producing means;

means for storing said foil in a wound state, said storing means being disposed substantially within said cartridge;

means for being powered, disposed substantially within said cartridge, for replacing a first portion of said image producing means, corresponding to a first printing run, with a second portion of said image producing means, corresponding to a subsequent printing run;

said foil comprising:

said first portion of said image producing means, corresponding to the first printing run; and said second portion of said image producing means, corresponding to the subsequent printing run; said storing means comprising:

first roll means for storing said foil in a wound state; and second roll means for receiving said foil and for winding said foil;

said means for being powered comprising means for:

unwinding said foil from said first roll means;

disposing said foil about a substantial portion of the plate cylinder;

winding said unwound foil on said second roll means; and replacing said first portion of said foil, corresponding to the first printing run, with said second portion of said foil, corresponding to the subsequent printing run, by unwinding a portion of said foil from said first roll means and winding another portion of said foil onto said second roll means;

means for selectively fastening said cartridge into groove means of the plate cylinder;

said cartridge being removable from the groove means by means of said fastening means; and said first roll means, said second roll means and said means for being powered being disposed within said cartridge.

12. The cartridge according to claim 11, further comprising:

said fastening means comprising means for selectively fastening said cartridge into axially-oriented groove means of the plate cylinder.

13. The cartridge according to claim 12, further comprising:

said means for being powered comprises roller means;

means for rotatably mounting said first roll means;

means for rotatably mounting said second roll means;

means for rotatably mounting said roller means of said means for being powered;

a first sidepiece;

a second sidepiece;

said first sidepiece and said second sidepiece each comprising a portion of each of said:

means for rotatably mounting said first roll means;

means for rotatably mounting said second roll means; and means for rotatably mounting said roller means of said means for being automatically powered; and support means, for being disposed axially with respect to the plate cylinder, for stabilizing said first and second sidepieces with respect to one another.

14. The cartridge according to claim 13, further comprising:

said roller means of said means for being powered comprising:

first and second deflector roller means;

first and second transport roller means;

said first deflector roller means being rotatingly engageable with said first transport roller means;

said second deflector roller means being rotatingly engageable with said second transport roller means;

said first deflector roller means and said first transport roller means being configured for:

receiving a leading edge of said foil from said first roll means;

transporting said leading edge of said foil towards said external surface of said plate cylinder; and continuing to direct said foil while said foil is being disposed about said plate cylinder and while said first portion of said foil is being replaced by said second portion of said foil; and said second deflector roller means and said second transport roller means being configured for:

receiving said leading edge of said foil from said external surface of said plate cylinder, once said foil has been disposed about said substantial portion of said plate cylinder;

transporting said leading edge of said foil towards said second roll means; and continuing to direct said foil while said foil is being disposed about said plate cylinder and while said first portion of said foil is being replaced by said second portion of said foil.

15. The cartridge according to claim 14, further comprising:

means for tightening said foil on said external surface of said plate cylinder;

said first and second transport roller means, and said first and second deflector roller means all for being disposed in the vicinity of said external surface of said plate cylinder;

guide tongue means disposed adjacent said second transport roller means and said second deflector roller means;

said guide tongue means being configured for:

receiving said leading edge of said foil from said external roller means when said foil has been disposed about said substantial portion of said plate cylinder;

directing said leading edge of said foil to said second transport roller means and said second deflector roller means;

said guide tongue means being pivotably mounted in said cartridge means;

means for pivoting said guide tongue means between a first position, wherein said guide tongue means is pivoted outwardly of said external surface of said plate cylinder, and a second position, wherein said guide tongue means is pivoted towards said external surface of said plate cylinder and is substantially flush with said external surface of said plate cylinder;

intermediate wheel means being rotatably engaged with drive wheel means of the plate cylinder, the drive wheel means for being rotatably mounted on spindle means of the plate cylinder at an end of the plate cylinder;

spur wheel means being disposed at an end of each of said second deflector roller means, said first transport roller means and said second transport roller means;

said intermediate wheel means comprising first, second, third and fourth intermediate wheels;

spur wheel means being disposed at an end of said second roll means;

said first intermediate wheel means being rotatably engaged with said spur wheel means of said second deflector roller means;

said second intermediate wheel means being rotatably engaged with said spur wheel means of said first transport roller means;

said third intermediate wheel means being rotatably engaged with said spur wheel means of said second transport roller means;

said fourth intermediate wheel means being rotatably engaged with said spur wheel means of said second roll means;

each of said first, second, third and fourth intermediate wheel means comprising freewheel means for ensuring a singular direction of rotation of each of said first, second, third and fourth intermediate wheel means; and slip clutch means mounted coaxially with said second roll means.

16. A method of operating a sheet-fed rotary printing press, wherein the printing press comprises: a frame, a plate cylinder for being rotatably mounted on the frame; and a blanket cylinder being rotatably mounted on the frame and for being engaged with the plate cylinder; the plate cylinder comprising an external surface; said method comprising the steps of:

providing means for producing an inked image and for transferring the inked image from the plate cylinder to the blanket cylinder;

configuring the image producing means to comprise a continuous web;

configuring the continuous web to comprise a plurality of portions for being disposed on the external surface of the plate cylinder;

configuring the plurality of portions to comprise a series of images corresponding to different printing runs;

configuring the image producing means for producing a printed product by means of an application of ink to the portions of the image producing means;

providing means for storing the continuous web in a wound state, the storing means being disposed substantially within the plate cylinder; and providing means for being automatically powered, disposed substantially within the plate cylinder, for automatically replacing a first portion of the image producing means, corresponding to a first printing run, with a second portion of the image producing means, corresponding to a subsequent printing run;

said method further comprising the additional steps of:

during a first printing run:

disposing the first portion of the image producing means on the external surface of the plate cylinder;

producing an inked image by applying ink to the first portion of the image producing means; and transferring the inked image from the plate cylinder to the blanket cylinder;

during a subsequent printing run:

disposing the second portion of the image producing means on the external surface of the plate cylinder;

producing an inked image by applying ink to the second portion of the image producing means; and transferring the inked image from the plate cylinder to the blanket cylinder;

subsequent to the first printing run and prior to the subsequent printing run, by means of the means for being automatically powered, automatically replacing the first portion of the image producing means with the second portion of the image producing means;

configuring the continuous web to comprise:

the first portion of the image producing means, corresponding to the first printing run; and the second portion of the image producing means, corresponding to the subsequent printing run;

said step of providing means for storing the continuous web in a wound state comprising the steps of:

providing first roll means for storing the continuous web in a wound state; and providing second roll means for receiving the continuous web and for winding the continuous web; configuring the means for being automatically powered for:

unwinding the continuous web from the first roll means;

disposing the continuous web about a substantial portion of the plate cylinder;

winding the unwound continuous web on the second roll means; and replacing the first portion of the continuous web, corresponding to the first printing run, with the second portion of the continuous web, corresponding to the subsequent printing run, by unwinding a portion of said continuous web from said first roll means and winding another portion of said continuous web onto said second roll means;

configuring the plate cylinder to comprise groove means;

providing cartridge means for being disposed within the groove means;

providing means for selectively fastening the cartridge means into the groove means;

configuring the cartridge means to be removable from the groove means by means of the fastening means;

disposing the first roll means, the second roll means and the means for being automatically powered within the cartridge means;

performing the following steps prior to the first printing run:

disposing the cartridge means within the groove means of the plate cylinder; and fastening the cartridge means into the groove means; and;

unwinding the continuous web from the first roll means;

disposing the continuous web about a substantial portion of the plate cylinder;

winding the unwound foil on the second roll means; and subsequent to the first printing run and prior to the subsequent printing run, replacing the first portion of the foil, corresponding to the first printing run, with the second portion of the foil, corresponding to the subsequent printing run, by unwinding a portion of said foil from said first roll means and winding another portion of said foil onto said second roll means; and removing the cartridge means from the groove means.

17. The method according to claim 16, wherein the groove means is oriented in an axial direction of the plate cylinder.

18. The method according to claim 17, further comprising the steps of:

configuring the means for being automatically powered to comprise roller means;

configuring the cartridge means to comprise:

means for rotatably mounting the first roll means;

means for rotatably mounting the second roll means;

means for rotatably mounting the roller means of the means for being automatically powered;

a first sidepiece;

a second sidepiece;

said first sidepiece and said second sidepiece each comprising a portion of each of said:

means for rotatably mounting said first roll means;

means for rotatably mounting said second roll means; and means for rotatably mounting said roller means of said means for being automatically powered; and support means, being disposed axially with respect to said plate cylinder, for stabilizing said first and second sidepieces with respect to one another.

19. The method according to claim 18, further comprising the steps of:

configuring the continuous web to comprise a foil;

configuring the means for being automatically powered to comprise:

first and second deflector roller means;

first and second transport roller means;

configuring the first deflector roller means to be rotatingly engageable with the first transport roller means;

configuring the second deflector roller means to be rotatingly engageable with the second transport roller means;

configuring the first deflector roller means and the first transport roller means for:

receiving a leading edge of the foil from the first roll means;

transporting the leading edge of the foil towards the external surface of the plate cylinder; and continuing to direct the foil while the foil is being disposed about the plate cylinder and while the first portion of the foil is being replaced by the second portion of the foil;

configuring the second deflector roller means and the second transport roller means for:

receiving the leading edge of the foil from the external surface of the plate cylinder, once the foil has been disposed about the substantial portion of the plate cylinder;

transporting the leading edge of the foil towards the second roll means; and continuing to direct the foil while the foil is being disposed about the plate cylinder and while the first portion of the foil is being replaced by the second portion of the foil; and performing the following steps:

receiving, at the first deflector roller means and the first transport roller means, a leading edge of the foil from the first roll means;

transporting the leading edge of the foil towards the external surface of the plate cylinder; and continuing to direct the foil with the first deflector roller means and the first transport roller means while the foil is being disposed about the plate cylinder;

receiving, at the second deflector roller means and the second transport roller means, the leading edge of the foil from the external surface of the plate cylinder, once the foil has been disposed about the substantial portion of the plate cylinder;

transporting the leading edge of the foil towards the second roll means;

continuing to direct the foil with the second deflector roller means and the second transport roller means while the foil is being disposed about the plate cylinder;

further directing the foil about the substantial portion of the plate cylinder, between the first roll means and the second roll means; and continuing to direct the foil about the substantial portion of the-plate cylinder until the first portion of the foil is replaced by the second portion of the foil.

20. The method according to claim 19, further comprising the steps of:

providing means for tightening the foil on the external surface of the cylinder;

disposing the first and second transport roller means, and the first and second deflector roller means all in the vicinity of the external surface of the plate cylinder;

providing external roller means;

configuring the external roller means to be selectively positionable between a first position, apart from the plate cylinder, and a second position, in engagement with the plate cylinder;

providing means for positioning the external roller means;

configuring the means for positioning the external roller means to comprise:

lever means being pivotably mounted on the frame, the external roller means being rotatably mounted on the lever means; and means for pivoting the lever means; configuring the external roller means for:

receiving, in cooperation with the plate cylinder, the leading edge of the foil from the first transport roller means and the first deflector roller means;

directing the leading edge of the foil about the substantial portion of the plate cylinder; and directing the leading edge of the foil to the second transport roller means and the second deflector roller means, once the foil has been disposed about the substantial portion of the plate cylinder;

providing guide tongue means disposed adjacent the second transport roller means and the second deflector roller means;

configuring the guide tongue means for:

receiving the leading edge of the foil from the external roller means when the foil has been disposed about the substantial portion of the plate cylinder;

directing the leading edge of the foil to the second transport roller means and the second deflector roller means;

pivotably mounting the guide tongue means in the cartridge means;

providing means for pivoting the guide tongue means between a first position, wherein the guide tongue means is pivoted outwardly of the external surface of the plate cylinder, and a second position, wherein the guide tongue means is pivoted towards the external surface of the plate cylinder and is substantially flush with the external surface of the plate cylinder;

providing drive wheel means and mounting the drive wheel means at an end of the plate cylinder;

providing spindle means and disposing the spindle means through the plate cylinder;

rotatably mounting the drive wheel means on the spindle means;

providing intermediate wheel means and rotatably engaging the same with the drive wheel means;

providing spur wheel means and disposing the same at an end of each of the second deflector roller means, the first transport roller means and the second transport roller means;

configuring the intermediate wheel means to comprise first, second, third and fourth intermediate wheels;

providing spur wheel means and disposing the same at an end of the second roll means;

rotatably engaging the first intermediate wheel means with the spur wheel means of the second deflector roller means;

rotatably engaging the second intermediate wheel means with the spur wheel means of the first transport roller means;

rotatably engaging the third intermediate wheel means with the spur wheel means of the second transport roller means;

rotatably engaging the fourth intermediate wheel means with the spur wheel means of the second roll means;

configuring each of the first, second, third and fourth intermediate wheel means to comprise freewheel means for ensuring a singular direction of rotation of each of the first, second, third and fourth intermediate wheel means;

providing catch lever means and mounting the same on the frame of the printing press;

configuring the catch lever means to comprise a recess;

disposing a bolt on the drive wheel means;

configuring the recess of the catch lever means for accommodating the bolt to arrest rotational movement of the drive wheel means;

configuring the catch lever means to be positionable between a first position, wherein the recess accommodates the bolt and the rotational movement of the drive wheel means is arrested, and a second position wherein the catch lever means is disposed away from the bolt to permit rotational movement of the drive wheel means;

providing locking lever means and pivotably mounting the same on the plate cylinder;

configuring the locking lever means for locking the bolt on the drive wheel means;

providing means for displacing the locking lever means to lock the bolt once the foil has been disposed about the substantial portion of the plate cylinder and has been tightened on the plate cylinder;

providing slip clutch means and mounting the same coaxially with the second roll means;

performing the following steps prior to the first printing run:

positioning the catch lever means into the first position, wherein the recess accommodates the bolt and the rotational movement of the drive wheel means is arrested;

receiving, at the first deflector roller means and the first transport roller means, a leading edge of the foil from the first roll means;

transporting the leading edge of the foil towards the external surface of the plate cylinder;

positioning the external roller means in the second position, adjacent the plate cylinder;

receiving, between the external roller means and the plate cylinder, the leading edge of the foil from the first transport roller means and the first deflector roller means;

directing the leading edge of the foil about the substantial portion of the plate cylinder;

directing the leading edge of the foil to the second transport roller means and the second deflector roller means, once the foil has been disposed about the substantial portion of the plate cylinder;

continuing to direct the foil while the foil is being disposed about the plate cylinder;

receiving, at the guide tongue means, the leading edge of the foil from the external roller means when the foil has been disposed about the substantial portion of the plate cylinder;

pivoting the guide tongue means between the first position, wherein the guide tongue means is pivoted outwardly of the external surface of the plate cylinder, and the second position, wherein the guide tongue means is pivoted towards the external surface of the plate cylinder and is substantially flush with the external surface of the plate cylinder;

directing the leading edge of the foil to the second transport roller means and the second deflector roller means;

receiving, at the second deflector roller means and the second transport roller means, the leading edge of the foil from the external surface of the plate cylinder, once the foil has been disposed about the substantial portion of the plate cylinder;

transporting the leading edge of the foil towards the second roll means; and continuing to direct the foil while the foil is being disposed about the plate cylinder;

tightening the foil on the external surface of the cylinder;

displacing the locking lever means to lock the bolt once the foil has been disposed about the substantial portion of the plate cylinder and has been tightened on the plate cylinder;

executing the first printing run;

positioning the catch lever means into the second position wherein the catch lever means is disposed away from the bolt to permit rotational movement of the drive wheel means;

performing the following steps subsequent to the first printing run and prior to the second printing run:

further directing the foil about the substantial portion of the plate cylinder, between the first roll means and the second roll means; and continuing to direct the foil about the substantial portion of the plate cylinder until the first portion of the foil is replaced by the second portion of the foil.

*21. A plate cylinder for a rotary printing press, which rotary printing press uses a printing foil to print an inked image, such a printing foil having a plurality of portions for printing a plurality of images corresponding to different printing runs, said plate cylinder comprising:*

*a cylinder jacket, said cylinder jacket comprising an external surface to support a printing foil thereon;*

*a passage disposed within said plate cylinder;*

*a cartridge being removably disposable within said passage of said plate cylinder;*

*an arrangement to mount a supply roll of printing foil within said cartridge;*

*an arrangement to mount an uptake roll within said cartridge to wind and store a used portion of printing foil with used printing images on the used printing foil;*

*a first deflector roller to guide a printing foil from said supply roll mounting arrangement to said external surface of said cylinder jacket;*

*a second deflector roller to guide a printing foil from said external surface of said cylinder jacket to said uptake roll mounting arrangement;*

*a first transport roller disposed adjacent to said first deflector roller to transport a printing foil from said supply roll mounting arrangement to said external surface of said cylinder jacket;*

*a second transport roller corresponding to said second deflector roller to transport a printing foil from said external surface of said cylinder jacket to said uptake roll mounting arrangement; and*

*said deflector rollers and said transport rollers being disposed within said cartridge.*

*22. The plate cylinder of claim 21, in combination with a pivoting roller, an intermediate roller, and a pivoting roller actuator, wherein:*

*said pivoting roller is disposed to pivot towards said external surface of said cylinder jacket to guide a leading edge of a printing foil around the plate cylinder;*

*said intermediate roller is configured to drive said pivoting roller;*

*said plate cylinder further comprises a guide tongue pivotally mounted to guide a leading edge of a printing foil between said second deflector roller and said second transport roller;*

*said pivoting roller actuator is configured to pivot said pivoting roller towards said external surface of said cylinder jacket; and*

*said guide tongue further comprises an actuator to pivot said guide tongue.*

*23. The plate cylinder of claim 21, wherein said plate cylinder further comprises:*

*a spindle;*

*a drive wheel disposed on an end of said plate cylinder and disposed to rotate on said spindle;*

*an arrangement to lock said drive wheel in position on said plate cylinder;*

*a first driving arrangement to operatively connect said first transport roller to said drive wheel to drive said first transport roller;*

*a second driving arrangement to operatively connect said second transport roller to said drive wheel to drive said second transport roller;*

*a third driving arrangement to operatively connect said second deflector roller to said drive wheel to drive said second deflector roller;*

*a fourth driving arrangement to operatively connect said uptake roll mounting arrangement to said drive wheel to drive an uptake roll disposed on said uptake roll mounting arrangement;*

*said second driving arrangement comprises a freewheel to permit said second driving arrangement to freewheel in one direction of rotation to prevent said second transport roller from being driven in one direction;*

*said third driving arrangement comprises a freewheel to permit said third driving arrangement to freewheel in one direction of rotation to prevent said second deflector roller from being driven in one direction; and*

*said fourth driving arrangement comprises a freewheel to permit said fourth driving arrangement to freewheel in one direction of rotation to prevent said uptake roll mounting arrangement from being driven in one direction.*

*24. The plate cylinder of claim 23, in combination with a catch lever, wherein:*

*said catch lever being pivotally disposable on a printing press side frame to selectively engage and hold said drive wheel in a stationary position to permit a printing foil to be threaded around said cylinder jacket and to permit a printing foil to be pulled taut around said cylinder jacket; and*

*said drive wheel locking arrangement comprises a locking lever disposed on said plate cylinder to lock said drive wheel to said plate cylinder to hold a printing foil taut around said cylinder jacket.*

*25. The plate cylinder of claim 21, in combination with a catch lever, wherein:*

*said plate cylinder further comprises a spindle;*

*said plate cylinder further comprises a drive wheel disposed on an end of said plate cylinder and disposed to rotate on said spindle;*

*said catch lever for being pivotally disposed on a printing press side frame to selectively engage and hold said drive wheel in a stationary position to permit a printing foil to be threaded around said cylinder jacket and to permit a printing foil to be pulled taut around said cylinder jacket; and*

*said plate cylinder further comprises a locking lever disposed on said plate cylinder to lock said drive wheel to said plate cylinder to hold a printing foil taut around said cylinder jacket.*

* * * * *